US009420446B2

(12) United States Patent
Brown et al.

(10) Patent No.: US 9,420,446 B2
(45) Date of Patent: Aug. 16, 2016

(54) COLLABORATIVE RESPONSE USING CAPABILITIES-AWARE HIVE NETWORK (71) Applicant: International Business Machines Corporation, Armonk, NY (US)

(72) Inventors: Douglas S. Brown, Charlotte, NC (US); Shawn D. Hennessy, Lisbon, ME (US); John F. Kelley, Clarkesville, GA (US); Todd P. Seager, Orem, UT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/595,507

(22) Filed: Jan. 13, 2015

(65) Prior Publication Data

US 2016/0205523 A1 Jul. 14, 2016

(51) Int. Cl.
*H04M 11/04* (2006.01)
*H04W 4/22* (2009.01)
*H04L 29/08* (2006.01)
*H04W 4/00* (2009.01)
*G08B 7/06* (2006.01)
*G08B 21/02* (2006.01)

(52) U.S. Cl.
CPC ............ *H04W 4/22* (2013.01); *H04L 67/1044* (2013.01); *H04L 67/306* (2013.01); *H04W 4/008* (2013.01); *G08B 7/062* (2013.01); *G08B 7/066* (2013.01); *G08B 21/02* (2013.01); *H04M 11/04* (2013.01)

(58) Field of Classification Search
CPC .... H04W 4/22; H04W 4/008; H04L 67/1044; H04L 67/306; G08B 21/02; G08B 7/062; G08B 7/066; H04M 11/04
USPC ....................................... 455/404.1, 521, 519
See application file for complete search history.

(56) References Cited

U.S. PATENT DOCUMENTS

| 8,063,737 | B2 | 11/2011 | Connell, II et al. |
| 8,599,801 | B2 * | 12/2013 | Baio et al. .................... 370/338 |
| 8,995,946 | B2 * | 3/2015 | Miller ......................... 455/404.1 |
| 2006/0261971 | A1 * | 11/2006 | Danvir ................... G08B 7/066 340/691.1 |
| 2006/0265489 | A1 | 11/2006 | Moore |

(Continued)

OTHER PUBLICATIONS

Hu et al., "A Service-oriented Mobile Social Networking Platform for Disaster Situations", 2013 46th Hawaii International Conference on System Sciences.

(Continued)

*Primary Examiner* — Mong-Thuy Tran
(74) *Attorney, Agent, or Firm* — Lisa Ulrich; Hoffman Warnick LLC (57) ABSTRACT

Various embodiments include approaches for coordinating collaborative response to an event using a capabilities-aware hive network. Some particular embodiments include a system having at least one computing device performing actions including: prompting a plurality of users to register with the capabilities-aware hive network, the prompting including requesting the plurality of users provide information about individual capabilities for response to the event; compiling the information from the plurality of users about individual capabilities for response to the event; obtaining data indicating occurrence of the event, and in response to obtaining the data indicating occurrence of the event, identifying and prioritizing individual user actions in response to the event based upon the information about the individual capabilities for response to the event; and providing user-specific instructions to the plurality of users to perform the individual user actions to respond to the event.

12 Claims, 8 Drawing Sheets

(56) References Cited

U.S. PATENT DOCUMENTS

| | | | |
|---|---|---|---|
| 2007/0011302 A1* | 1/2007 | Groner et al. ................. 709/224 | |
| 2009/0138353 A1* | 5/2009 | Mendelson .......... G01C 21/206 | |
| | | | 705/14.39 |
| 2010/0136945 A1* | 6/2010 | Givens ................... G06Q 10/04 | |
| | | | 455/404.2 |
| 2010/0159976 A1* | 6/2010 | Marocchi et al. ............. 455/519 | |
| 2011/0130636 A1* | 6/2011 | Daniel ................. G08B 25/016 | |
| | | | 600/301 |
| 2011/0143651 A1* | 6/2011 | Marocchi et al. ............ 455/3.06 | |
| 2011/0183644 A1* | 7/2011 | Gupta ................... G08B 7/066 | |
| | | | 455/404.2 |
| 2011/0208852 A1* | 8/2011 | Looney ................. G06Q 30/06 | |
| | | | 709/223 |
| 2012/0151501 A1* | 6/2012 | Manmohan ................... 719/317 | |
| 2013/0052982 A1 | 2/2013 | Rohde et al. | |
| 2013/0065628 A1* | 3/2013 | Pfeffer .......................... 455/521 | |
| 2013/0073327 A1* | 3/2013 | Edelberg ...................... 705/7.13 | |
| 2013/0275976 A1* | 10/2013 | Dawson ............... G06F 9/5061 | |
| | | | 718/1 |
| 2014/0250179 A1 | 9/2014 | Brown et al. | |
| 2015/0049163 A1* | 2/2015 | Smurro ...................... 348/14.08 | |
| 2016/0094965 A1* | 3/2016 | Sennett ............. H04W 72/0453 | |
| | | | 455/404.1 |

OTHER PUBLICATIONS

Deb et al., "Coordinating Disaster Relied Operations Using Smart Phone/PDA Based Peer-to-Peer Communication", International Journal of Wireless & Mobile Networks vol. 4, No. 6, Dec. 2012.

Gottipati, Hari, With iBeacon, Apple is going to dump on NFC and embrace the internet of things, https://gigaom.com/2013/09/10/with-ibeacon-apple-is-going-to-dump-on-nfc-and-embrace-the-internet-of-things/, Retrieved Jul. 30, 2014.

Fernandez et al., "Strategies for Managing Volunteers during Incident Response: A Systems Approach".

Jang et al, "Rescue Information System for Earthquake Disasters Based on MANET Emergency Communication Platform", Copyright 2009, ACM.

* cited by examiner

COLLABORATIVE RESPONSE USING CAPABILITIES-AWARE HIVE NETWORK

TECHNICAL FIELD

Aspects of the invention relate generally to managing and enhancing response to disaster scenarios. More particularly, various aspects of the invention relate to approaches for enhancing response to disaster scenarios using a hive network.

BACKGROUND

Collaborative applications are designed to help people involved in a common task achieve goals. The design intent of collaborative applications is to transform the way documents and rich media are shared to enable more effective team collaboration. Collaborative applications provide tools that aid communication, collaboration and the process of problem solving. Additionally, collaborative applications may support project management functions, such as task assignments, time-managing deadlines, work flow, and shared calendars.

Collaborative applications should support the individuals that make up the team and the interactions between them during the group decision making process. The software may also support team membership, roles and responsibilities. Additionally, collaborative support systems may offer the ability to support ancillary systems, such as budgets and physical resources.

SUMMARY

Various embodiments include approaches for coordinating collaborative response to an event using a capabilities-aware hive network. Some particular embodiments include a system having at least one computing device configured to coordinate collaborative response to an event using a capabilities-aware hive network by performing actions including: prompting a plurality of users to register with the capabilities-aware hive network, the prompting including requesting the plurality of users provide information about individual capabilities for response to the event; compiling the information from the plurality of users about individual capabilities for response to the event; obtaining data indicating occurrence of the event, and in response to obtaining the data indicating occurrence of the event, identifying and prioritizing individual user actions in response to the event based upon the information about the individual capabilities for response to the event; and providing user-specific instructions to the plurality of users to perform the individual user actions to respond to the event.

A first aspect includes a system having at least one computing device configured to coordinate collaborative response to an event using a capabilities-aware hive network by performing actions including: prompting a plurality of users to register with the capabilities-aware hive network, the prompting including requesting the plurality of users provide information about individual capabilities for response to the event; compiling the information from the plurality of users about individual capabilities for response to the event; obtaining data indicating occurrence of the event, and in response to obtaining the data indicating occurrence of the event, identifying and prioritizing individual user actions in response to the event based upon the information about the individual capabilities for response to the event; and providing user-specific instructions to the plurality of users to perform the individual user actions to respond to the event A second aspect includes a computer program product having program code stored on a computer readable storage medium, which when executed by at least one computing device, causes the at least one computing device to coordinate collaborative response to an event using a capabilities-aware hive network by performing actions including: prompting a plurality of users to register with the capabilities-aware hive network, the prompting including requesting the plurality of users provide information about individual capabilities for response to the event; compiling the information from the plurality of users about individual capabilities for response to the event; obtaining data indicating occurrence of the event, and in response to obtaining the data indicating occurrence of the event, identifying and prioritizing individual user actions in response to the event based upon the information about the individual capabilities for response to the event; and providing user-specific instructions to the plurality of users to perform the individual user actions to respond to the event.

A third aspect includes a computer-implemented method of coordinating collaborative response to an event using a capabilities-aware hive network, the method performed on at least one computing device, the method including: prompting a plurality of users to register with the capabilities-aware hive network, the prompting including requesting the plurality of users provide information about individual capabilities for response to the event; compiling the information from the plurality of users about individual capabilities for response to the event; obtaining data indicating occurrence of the event, and in response to obtaining the data indicating occurrence of the event, identifying and prioritizing individual user actions in response to the event based upon the information about the individual capabilities for response to the event; and providing user-specific instructions to the plurality of users to perform the individual user actions to respond to the event.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. A detailed description of cloud computing is given in this section to provide a better understanding of the underlying teachings discussed herein.

The present invention will now be described in detail with reference to the Figures.

Figure 1:
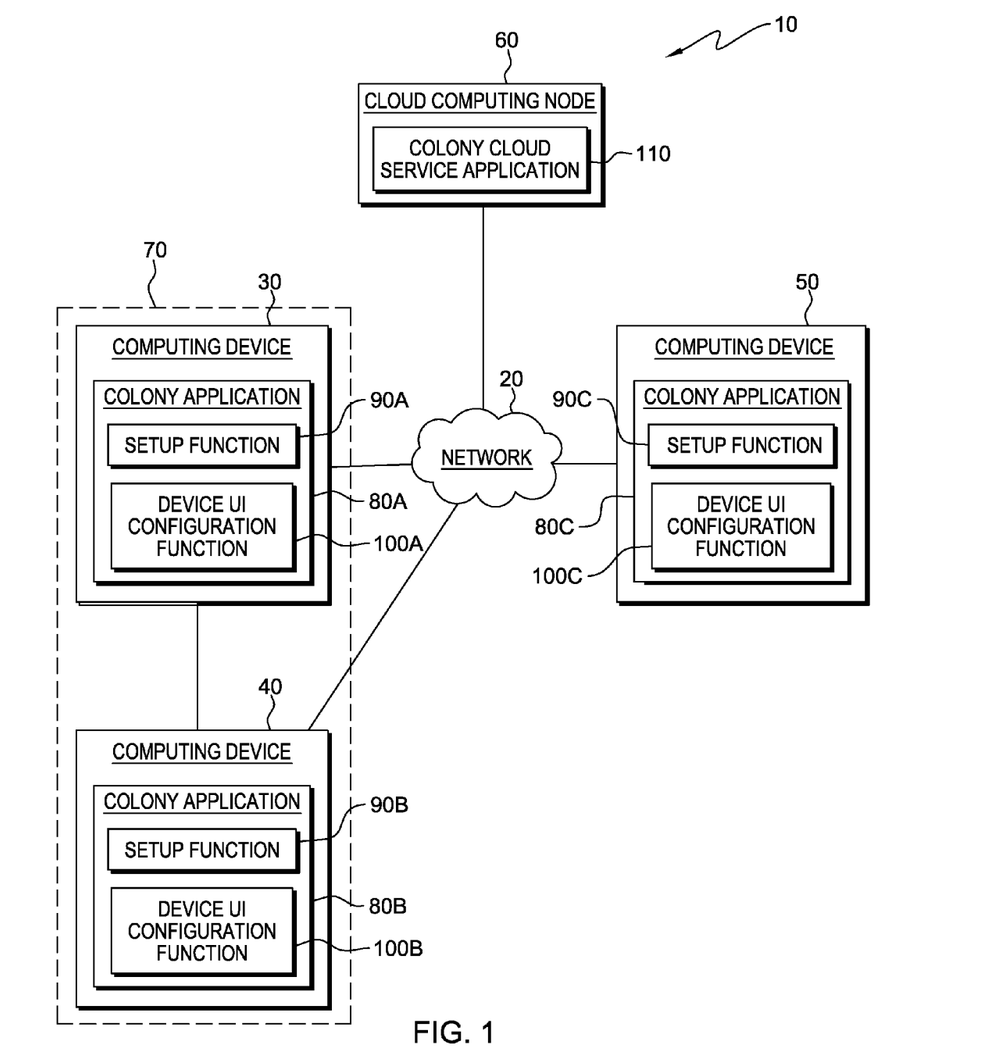
FIG. 1 depicts a diagram of a computing environment in accordance with one embodiment of the present invention.

FIG. 1 depicts a diagram of computing environment 10 in accordance with one embodiment of the present invention. FIG. 1 provides only an illustration of one embodiment and does not imply any limitations with regard to the environments in which different embodiments may be implemented. In another embodiment, computing environment 10 is a cloud computing environment as described in reference to FIGS. 5 and 6.

In the depicted embodiment, computing environment 10 includes computing device 30, computing device 40, computing device 50, and cloud computing node 60, interconnected over network 20. Network 20 is a wide area network (WAN) such as the Internet. In other embodiments, network 20 may be a local area network (LAN), or any combination of connections and protocols that will support communications between computing device 30, computing device 40, computing device 50, and cloud computing node 60 in accordance with embodiments of the invention. Network 20 may include wired, wireless, or fiber optic connections. Computing environment 10 may include additional computing devices, servers, or other devices not shown. $ Computing device 30 is a laptop computer. In other embodiments, computing device 30 may be a desktop computer, tablet computer, smart phone or personal digital assistant (PDA). In general, computing device 30 may be any electronic device or computing system capable of sending and receiving data, and communicating with computing device 40, computing device 50, and cloud computing node 60 over network 20. Computing device 30 contains colony application 80A, setup function 90A, and device user interface (UI) configuration function 100A.

Computing device 40 can include a smart phone. In other embodiments, computing device 40 may include a laptop computer, tablet computer, desktop computer or personal digital assistant (PDA). In general, computing device 40 may be any electronic device or computing system capable of sending and receiving data, and communicating with computing device 30, computing device 50, and cloud computing node 60 over network 20. Computing device 40 contains colony application 80B, setup function 90B, and device UI configuration function 100B.

Computing device 30 and computing device 40 are at location 70. Location 70 is an area where computing device 30 and computing device 40 may communicate using a computer network with a small geographic scope. Computer networks with a small geographic scope range from Near Field Communication (NFC) to Local Area Networks (LANs). A computer network with a small geographic scope typically does not have a connection to the Internet or other remote networks. In another embodiment, location 70 may be a geographic area defined by a Global Positioning System (GPS) coordinate and a radius around the GPS coordinate. In yet another embodiment, location 70 may be a geographic area defined by GPS coordinate boundaries.

In yet another embodiment, location 70 may be a location determined by a context of a device. In one embodiment, the context of a device may be a representation of the physical world around the device. This embodiment may apply to locations that may not have been predetermined using GPS or to locations too small in nature to be referenced by GPS or LAN. The context of the device may be determined based on data collected from the device. The data collected from the device may be from any sensor with an available callable API. Example sensors may be an accelerometer, a gyroscope, an ambient light sensor, a microphone, a thermometer, or a camera. For example, using the data collected, the device can determine the location of the device by comparing the data collected to a database of locations with associated data points. The data points may comprise sensor data expected to be detected in certain locations.

Computing device 50 can include a laptop computer. In other embodiments, computing device 50 can include a desktop computer, tablet computer, smart phone or personal digital assistant (PDA). In general, computing device 50 may be any electronic device or computing system capable of sending and receiving data, and communicating with computing device 30, computing device 40, and cloud computing node 60 over network 20. Computing device 50 contains colony application 80C, setup function 90C, and device UI configuration function 100C.

Cloud computing node 60 is a server computer. In other embodiments, cloud computing node 60 may be a management server, a web server, or any other electronic device capable of receiving and sending data. In another embodiment, cloud computing node 60 may represent a server computing system utilizing multiple computers as a server system, such as in a cloud computing environment. Cloud computing node 60 may be practiced in distributed cloud computing environments where tasks are performed by remote processing devices linked through a communications network. In a distributed cloud computing environment, programs may be located in both local and remote computer system storage devices including memory storage devices. Cloud computing node 60 contains colony cloud service application 110. Colony cloud service application 110 is a cloud service program that may facilitate the communication between colony application 80A, 80B, and 80C over network 20.

Figure 4:
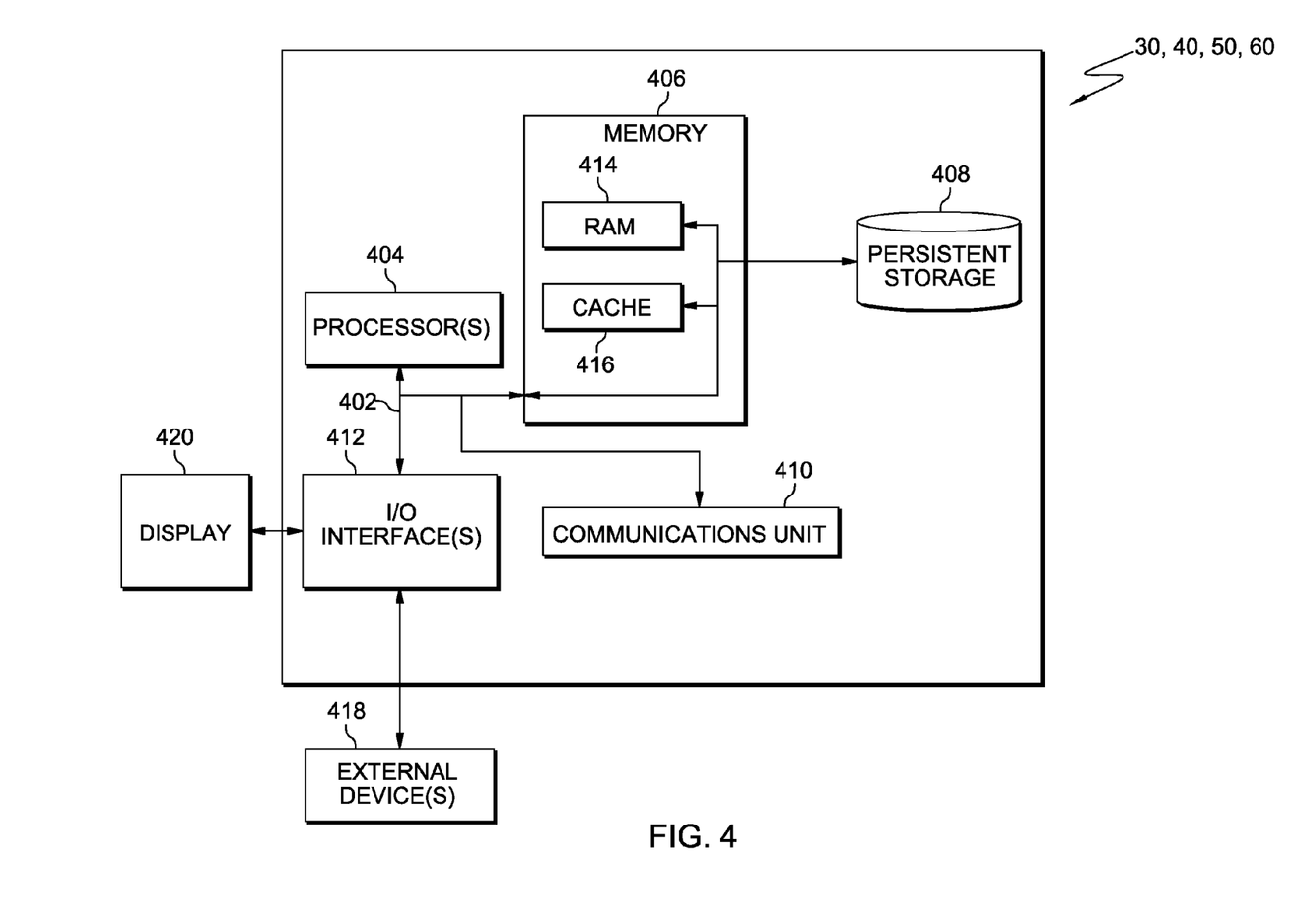
FIG. 4 depicts a block diagram of components of the computing devices and the cloud computing node of FIG. 1 in accordance with one embodiment of the present invention.

Computing device 30, computing device 40, computing device 50, and cloud computing node 60 may each include components as depicted in further detail with respect to FIG. 4.

In an example, computing environment 10 is a computing environment based around an event, e.g., a disaster event such as a natural disaster event (as described herein). In this example, computing device 30 is laptop computer with a large display attached as an external device. The large display may be used to show the layout of the event site. Computing device 40 is a smart phone with an integrated camera and geotagging (process of adding geographical identification metadata to various media) capabilities. The camera and geotagging capabilities may be used to photograph and locate an object, status, situation, etc. at an event. Computing device 50 can include a laptop computer used by a coordinator who is offsite to monitor the site of event.

Colony application 80A is a collaborative computing program using a plurality of computing devices. In the context of the example of computing environment 10, colony application 80A may be a custom event response coordination application. Colony application 80A executes setup function 90A and device UI configuration function 100A. In other embodiments, the functionality of colony application 80A, setup function 90A, and device UI configuration function 100A may take place on cloud computing node 60. Colony application 80A, 80B, and 80C are different instances of the same application on different devices.

Setup function 90A operates to configure colony application 80A for operation. In one embodiment, setup function 90A determines capabilities needed for colony application 80A to function. In one embodiment, the capabilities needed for colony application 80A to function comprise device capabilities. Device capabilities may correspond to certain inputs or outputs. Device capabilities may also correspond to specific devices or device types. In the example of computing environment 10, a laptop computer with a large display attached (for output) and a smart phone with an integrated camera and geotagging capabilities (for input) are needed for colony application 80A to function. In another embodiment, the capabilities needed for colony application 80A to function may also comprise user capabilities. User capabilities may correspond to certain users that must be connected with colony application 80A. In the example of computing environment 10, a coordinator using a laptop computer to monitor the site of the event may aid colony application 80A in functioning. However, as described herein, colony application 80A may be effectively crowd-sourced, such that a single coordinator is not necessary in order to provide the various functions of colony application 80A.

Setup function 90A may also operate to allow other instances of colony application 80A, for example colony application 80B and 80C running on other devices, to discover colony application 80A which has already been configured for a particular use. In one embodiment, setup function 90A enables a device proximity detection function. Setup function 90A is discussed in further detail with respect to FIG. 2. Setup function 90A, 90B, and 90C operate in the same manner.

Device UI configuration function 100A operates to determine whether the capabilities needed for colony application 80A to function are met. In one embodiment, device UI configuration function 100A analyzes the device capabilities of each device running other instances of colony application 80A (e.g., colony application 80B and 80C) which are connected to colony application 80A to determine if the capabilities needed for colony application 80A to function are met. In another embodiment, device UI configuration function 100A may also analyze the user capabilities of a user using the instance of colony application 80A (e.g., colony application 80B and 80C) to determine if the capabilities needed for colony application 80A to function are met.

Device UI configuration function 100A may also operate to configure the UI's of the other instances of colony application 80A, for example colony application 80B and 80C, running on other devices. In one embodiment, a UI is configured based on the device capabilities of the device running the instance of colony application 80A (e.g., colony application 80B and 80C). The UI may also be configured based on the user capabilities of a user using the instance of colony application 80A (e.g., colony application 80B and 80C).

The UI may also be configured based on the environment of the device running the instance of colony application 80A (e.g., colony application 80B and 80C). In one embodiment, the environment of the device is a location of the device. For example, the location of the device may be the geographic location of the device. In another embodiment, the environment of the device is a context of the device. The context of the device may be determined based on data collected from the device. Device UI configuration function 100A is discussed in further detail with respect to FIG. 3. Device UI configuration function 100A, 100B, and 100C operate in the same manner.

Figure 2:
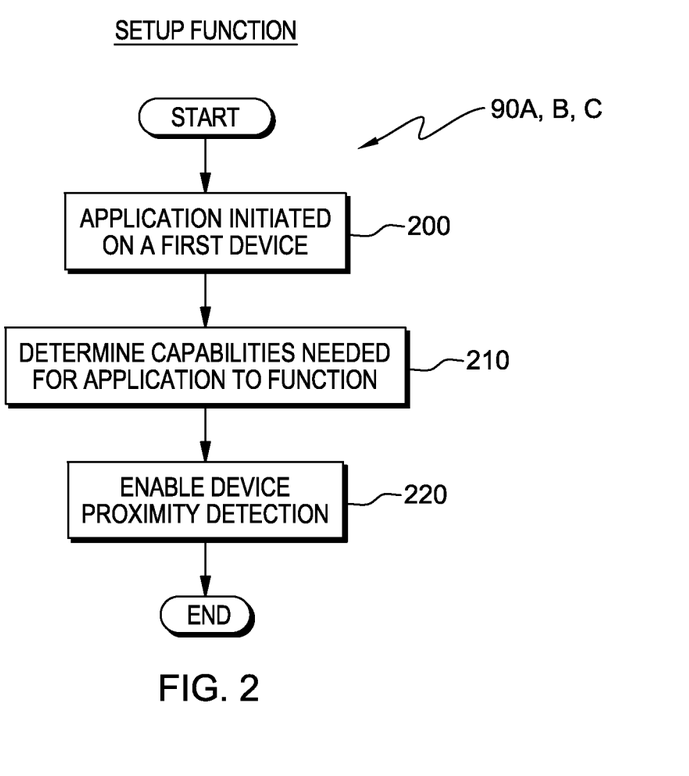
FIG. 2 depicts a flowchart of processes of a setup function executing within the computing environment of FIG. 1, in accordance with one embodiment of the present invention.

FIG. 2 depicts a flowchart of the steps of setup function 90A executing within the computing environment of FIG. 1, for configuring colony application 80A for operation, in accordance with one embodiment of the present invention. Initially, a user at a first computing device (computing device 30) initiates colony application 80A. In one embodiment, the user decides whether to configure colony application 80A for a particular use or to search for other instances of colony application 80A (e.g., colony application 80B and 80C) that have already been configured for operation. For example, the user may be presented with the options mentioned above. The presentation may be in the form of a popup or a menu.

If the user decides to search for other instances of colony application 80A (e.g., colony application 80B and 80C), already configured for operation, colony application 80A attempts to connect with the other instances of configured colony application 80A. In one embodiment, colony application 80A looks for the other instances of colony application 80A connected to a common computer network with a small geographic scope (e.g., NFC or LAN). For example, if computing device 30 has Bluetooth® capabilities colony application 80A looks for other Bluetooth discoverable devices. The other discoverable devices may be running instances of colony application 80A, configured for operation. In another embodiment, colony application 80A looks for other instances of colony application 80A configured for operation connected to colony cloud service application 110. For example, if an instance of colony application 80A already configured for operation is not connected to a computer network with a small geographic scope, it will connect to colony cloud service application 110 in order to communicate with other devices.

If the user decides to configure colony application 80A for a particular use, the user will choose to initiate setup function 90A. In step 200, setup function 90A is initiated by a user at computing device 30.

In step 210, setup function 90A determines the capabilities needed for colony application 80A to function. In one embodiment, the capabilities needed for colony application 80A to function are preconfigured in the application. In another embodiment, the capabilities needed for colony application 80A to function are entered by the user. In yet another embodiment, the capabilities needed for colony application 80A to function are determined by the user with guidance from a template. The template may be a list of suggested capabilities for a particular use of colony application 80A.

For example, in the example of computing environment 10, capabilities needed for colony application 80A to function comprise a laptop computer with a large display attached (for output), a smart phone with an integrated camera and geotagging capabilities (for input), and a coordinator using a laptop computer to monitor the event site. Setup function 90A may also determine optional capabilities to enhance the operation of colony application 80A. For example, additional smart phones with an integrated camera and geotagging capabilities (for input) may be used.

In step 220, setup function 90A enables a device proximity detection function to allow other instances of colony application 80A (e.g., colony application 80B and 80C) to connect to colony application 80A. In one embodiment, setup function 90A connects colony application 80A to a common computer network with a small geographic scope (e.g., NFC or LAN). For example, if computing device 30 has Bluetooth® capabilities, colony application 80A makes computing device 30 discoverable. In another embodiment, setup function 90A connects colony application 80A to colony cloud service application 110.

Figure 3:
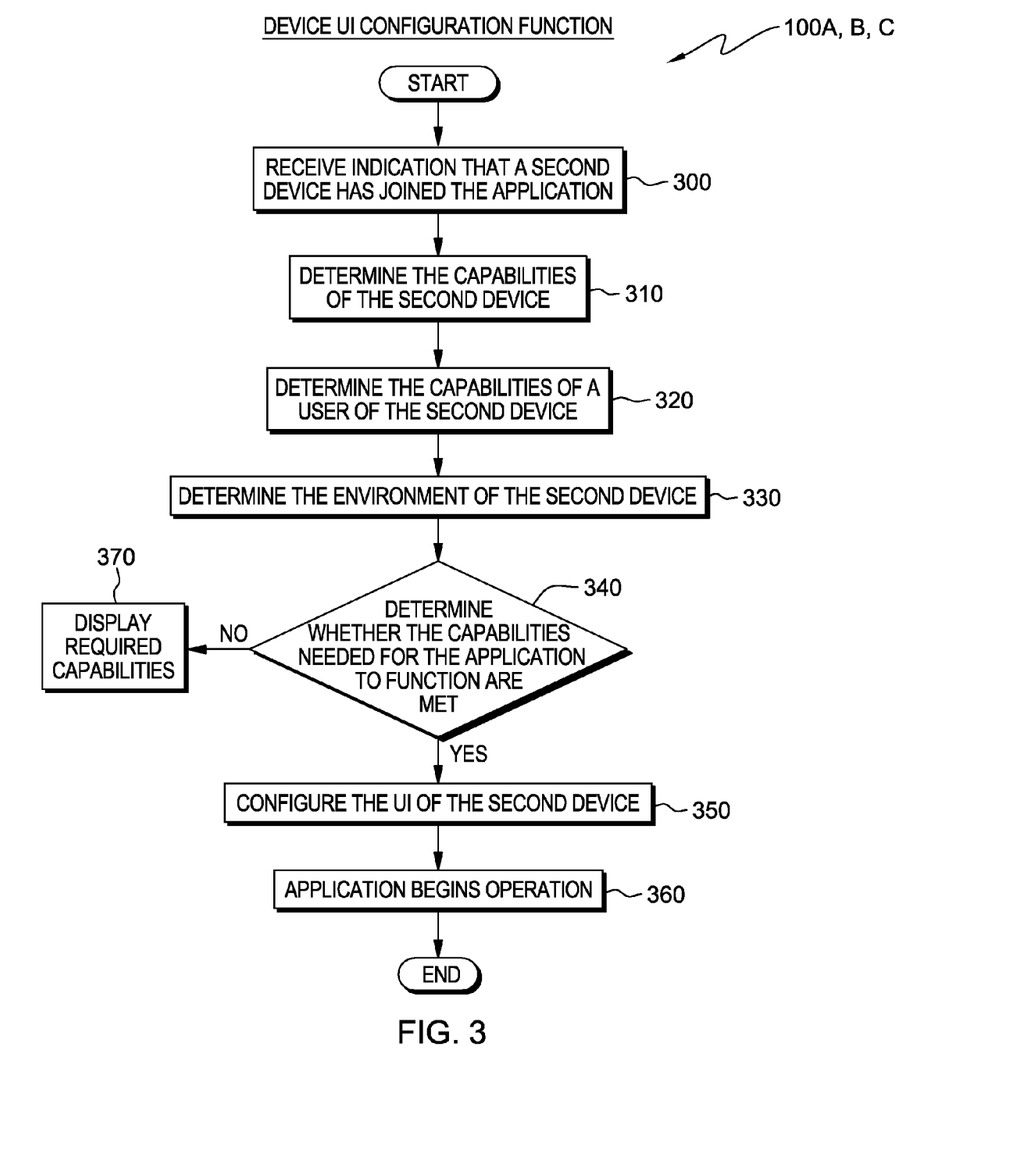
FIG. 3 depicts a flowchart of processes performed by a device user interface (UI) configuration function executing within the computing system of FIG. 1, in accordance with another embodiment of the present invention.

FIG. 3 depicts a flowchart of the steps of device UI configuration function 100A executing within the computing system of FIG. 1, for determining whether the capabilities needed for colony application 80A to function are met, in accordance with one embodiment of the present invention. Initially, a user at a second computing device (computing device 40) initiates colony application 80B. According to the process described in reference to FIG. 2, the user decides to search for other instances of colony application 80B (e.g., colony application 80A) already configured for operation. Colony application 80B connects to colony application 80A already configured for operation and running on computing device 30.

In step 300, device UI configuration function 100A receives an indication that colony application 80B running on computing device 40 has joined colony application 80A. In response to receiving the indication that colony application 80B running on computing device 40 has joined colony application 80A, device UI configuration function 100A determines the capabilities of computing device 40 (step 310). In one embodiment, device UI configuration function 100A calls colony application 80B to retrieve the capabilities of computing device 40. The capabilities of computing device 40 may be preregistered by the user using colony application 80B. The capabilities of computing device 40 may be stored on computing device 40 or on cloud computing node 60 for use by colony application 80B. For example, in the example of computing environment 10, the capabilities of computing device 40 comprise a smart phone with an integrated camera and geotagging capabilities (for input). This example has a specific device type (e.g., a smart phone) and specific inputs (e.g., camera, geotagging).

In step 320, device UI configuration function 100A determines the capabilities of the user at computing device 40. In one embodiment, device UI configuration function 100A calls colony application 80B to retrieve the capabilities of the user at computing device 40. The capabilities of the user of computing device 40 may be preregistered by the user using colony application 80B. The capabilities of the user may be stored on computing device 40 or on cloud computing node 60 for use by colony application 80B. For example, in the example of computing environment 10, the capabilities of the user of computing device 50 comprise a coordinator to monitor the event site. This example may include a specific user type (e.g., a coordinator).

In step 330, device UI configuration function 100A determines the environment of computing device 40. In one embodiment, the environment of the device is the location of the device. For example, device UI configuration function 100A calls colony application 80B to determine a location of computing device 40. Colony application 80B sends a request for the geographic location of computing device 40 to an application programming interface (API) of a GPS receiver (not shown) integrated with computing device 40. A GPS receiver can determine its location and present that location as longitude and latitude coordinates.

In another embodiment, the environment of the device may be a context of the device. The context of the device may be determined based on data collected from the device. The data collected from the device may be from any sensor with an available callable API. For example, device UI configuration function 100A may call colony application 80B to determine the context of computing device 40. Colony application 80B sends requests to the API's of all available sensors integrated with computing device 40. Example sensors may be an accelerometer, a gyroscope, an ambient light sensor, a microphone, or a thermometer.

Device UI configuration function 100A determines whether the capabilities needed for colony application 80A to function are met (decision 340). In one embodiment, device UI configuration function 100A compares the capabilities needed for colony application 80A to function (created in step 210) to the capabilities of computing device 30, computing device 40, the user of computing device 30, and the user of computing device 40. The capabilities of computing device 30 and the user of computing device 30 may be preregistered for use by colony application 80A and therefore known to device UI configuration function 100A.

In the example of computing environment 10, capabilities needed for colony application 80A to function comprise a laptop computer with a large display attached (for output), a smart phone with an integrated camera and geotagging capabilities (for input), and in some cases, a coordinator using a laptop computer to monitor the event site. With only the capabilities of computing device 30, computing device 40, the user of computing device 30, and the user of computing device 40 the capabilities needed for colony application 80A to function may be met.

If device UI configuration function 100A determines that the capabilities needed for colony application 80A to function are met (decision 340, yes branch), device UI configuration function 100A proceeds to step 350.

In step 350, device UI configuration function 100A configures the UI of colony application 80B running on computing device 40. The UI of colony application 80B running on computing device 40 is configured based on at least the capabilities of computing device 40. The UI of colony application 80B may also be configured based on the capabilities of the user at computing device 40. The UI of colony application 80B may also be configured based on the environment of computing device 40 (determined in step 330).

In one embodiment, device UI configuration function 100A determines an appropriate UI for colony application 80B based on at least the capabilities of computing device 40. Each incidence of the colony application contains the same plurality of available UI's. Each of the plurality of available UI's may be associated with one or more device capabilities.

These associations may be preregistered during the setup process of colony application 80A. Device UI configuration function 100A compares the capabilities of computing device 40 to the device capabilities associated with each of the plurality of available UI's to find a complete match. Device UI configuration function 100A causes a particular UI with one or more associated device capabilities that completely match the capabilities of computing device 40 to be displayed on computing device 40.

Each of the plurality of UI's may also be associated with one or more user capabilities or one or more device environments. The process of matching by device UI configuration function 100A functions in the same manner to find an appropriate UI for colony application 80B. For example, if the environment of the device is the location of the device an appropriate UI may be associated with a specific geographic location. Device UI configuration function 100A would compare the environment (geographic location) of computing device 40 to an environment associated with each of the plurality of available UI's to find a match.

In step 360, device UI configuration function 100A sends command to begin operation to colony application 80A. In another embodiment, after step 350 is performed colony application 80A automatically begins operation. If device UI configuration function 100A determines the capabilities needed for colony application 80A to function are not met (decision 340, no branch), device UI configuration function 100A causes the required capabilities, still needed for colony application 80A to function, to be displayed (step 370). In one embodiment, device UI configuration function 100A sends a command to the UI of colony application 80A on computing device 30 to display a popup indicating the capabilities still needed. In another embodiment, device UI configuration function 100A causes an indication of the capabilities still needed to be displayed in the UI of colony application 80B.

Cloud Computing Description

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 4 depicts a block diagram of components of computing device 30, computing device 40, computing device 50, and cloud computing node 60 in accordance with one embodiment of the present invention. It should be appreciated that FIG. 4 provides only an illustration of one implementation and does not imply any limitations with regard to the environments in which different embodiments may be implemented. Many modifications to the depicted environment may be made.

Computing device 30, computing device 40, computing device 50, and cloud computing node 60 each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In one embodiment, memory 406 includes random access memory (RAM) 414 and cache memory 416. In general, memory 406 can include any suitable volatile or non-volatile computer-readable storage media.

Colony application 80A, setup function 90A, and device UI configuration function 100A are stored in persistent storage 408 of computing device 30 for execution by one or more of the respective computer processors 404 of computing device 30 via one or more memories of memory 406 of computing device 30. Colony application 80B, setup function 90B, and device UI configuration function 100B are stored in persistent storage 408 of computing device 40 for execution by one or more of the respective computer processors 404 of computing device 40 via one or more memories of memory 406 of computing device 40. Colony application 80C, setup function 90C, and device UI configuration function 100C are stored in persistent storage 408 of computing device 50 for execution by one or more of the respective computer processors 404 of computing device 50 via one or more memories of memory 406 of computing device 50. Colony cloud service application 110 is stored in persistent storage 408 of cloud computing node 60 for execution by one or more of the respective computer processors 404 of cloud computing node 60 via one or more memories of memory 406 of cloud computing node 60. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other servers, data processing systems, or devices. In these examples, communications unit 410 includes one or more network interface cards. Communications unit 410 may provide communications through the use of either or both physical and wireless communications links. Colony application 80A, setup function 90A, and device UI configuration function 100A may be downloaded to persistent storage 408 of computing device 30 through communications unit 410 of computing device 30. Colony application 80B, setup function 90A, and device UI configuration function 100B may be downloaded to persistent storage 408 of computing device 40 through communications unit 410 of computing device 40.

Colony application 80C, setup function 90C, and device UI configuration function 100C may be downloaded to persistent storage 408 of computing device 50 through communications unit 410 of computing device 50. Colony cloud service application 110 may be downloaded to persistent storage 408 of cloud computing node 60 through communications unit 410 of cloud computing node 60.

I/O interface(s) 412 allows for input and output of data with other devices that may be connected to computing system 10. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., colony application 80A, setup function 90A, and device UI configuration function 100A, can be stored on such portable computer-readable storage media and can be loaded onto persistent storage 408 of computing device 30 via I/O interface(s) 412 of computing device 30. Software and data used to practice embodiments of the present invention, e.g., colony application 80B, setup function 90B, and device UI configuration function 100B, can be stored on such portable computer-readable storage media and can be loaded onto persistent storage 408 of computing device 40 via I/O interface(s) 412 of computing device 40. Software and data used to practice embodiments of the present invention, e.g., colony application 80C, setup function 90C, and device UI configuration function 100C, can be stored on such portable computer-readable storage media and can be loaded onto persistent storage 408 of computing device 50 via I/O interface(s) 412 of computing device 50.

Software and data used to practice embodiments of the present invention, e.g., colony cloud service application 110 can be stored on such portable computer-readable storage media and can be loaded onto persistent storage 408 of cloud computing node 60 via I/O interface(s) 412 of cloud computing node 60. I/O interface(s) 412 also connect to a display 420.

Display 420 provides a mechanism to display data to a user and may be, for example, a computer monitor or a touch screen.

Figure 5:
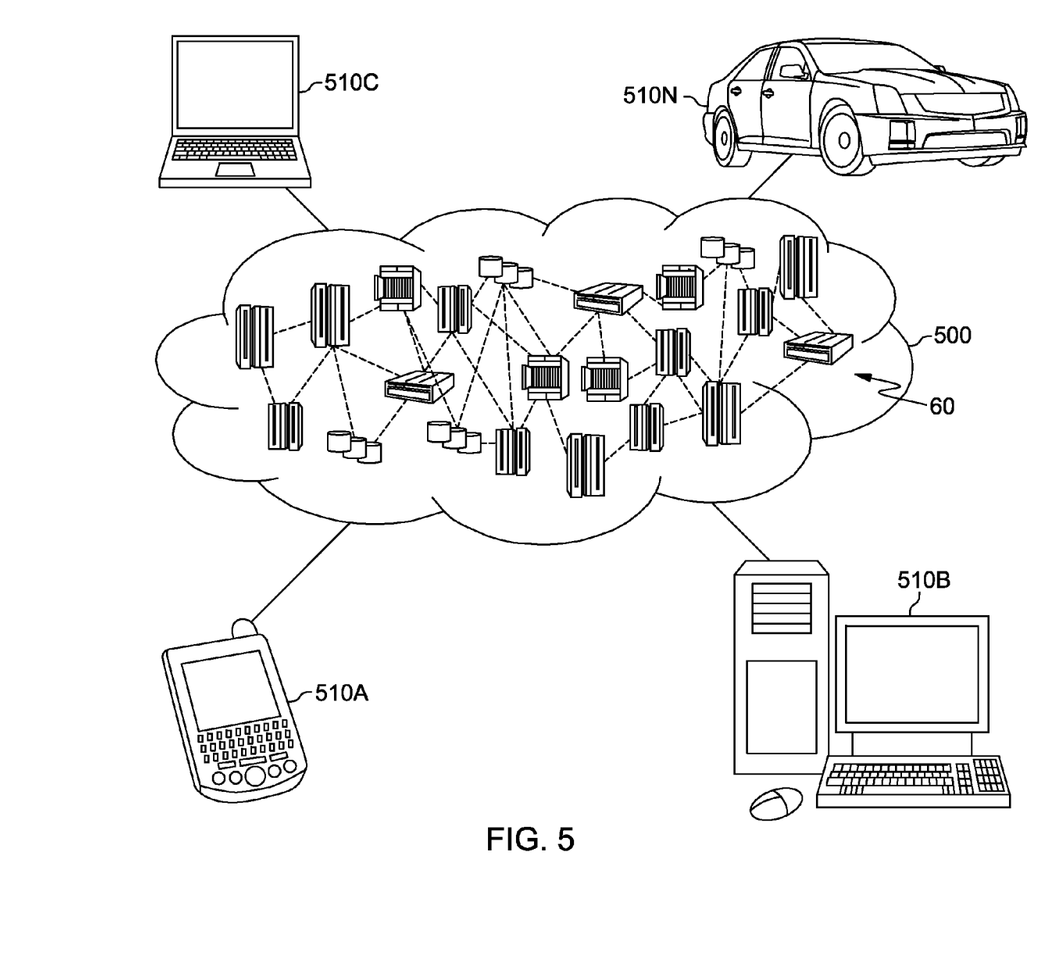
FIG. 5 depicts a cloud computing environment in accordance with one embodiment of the present invention.

FIG. 5 depicts a cloud computing environment according to an embodiment of the present invention. As shown, cloud computing environment 500 comprises one or more cloud computing nodes 60 with which local computing devices used by cloud consumers, such as, for example, personal digital assistant (PDA) or cellular telephone 510A, desktop computer 510B, laptop computer 510C, and/or automobile computer system 510N may communicate. Nodes 60 may communicate with one another. They may be grouped (not shown) physically or virtually, in one or more networks, such as private, community, public, or hybrid clouds as described hereinabove, or a combination thereof. This allows cloud computing environment 500 to offer infrastructure, platforms, and/or software as services for which a cloud consumer does not need to maintain resources on a local computing device. It is understood that the types of computing devices 510A-N shown in FIG. 5 are intended to be illustrative only and that computing nodes 60 and cloud computing environment 500 can communicate with any type of computerized device over any type of network and/or network addressable connection (e.g., using a web browser).

Figure 6:
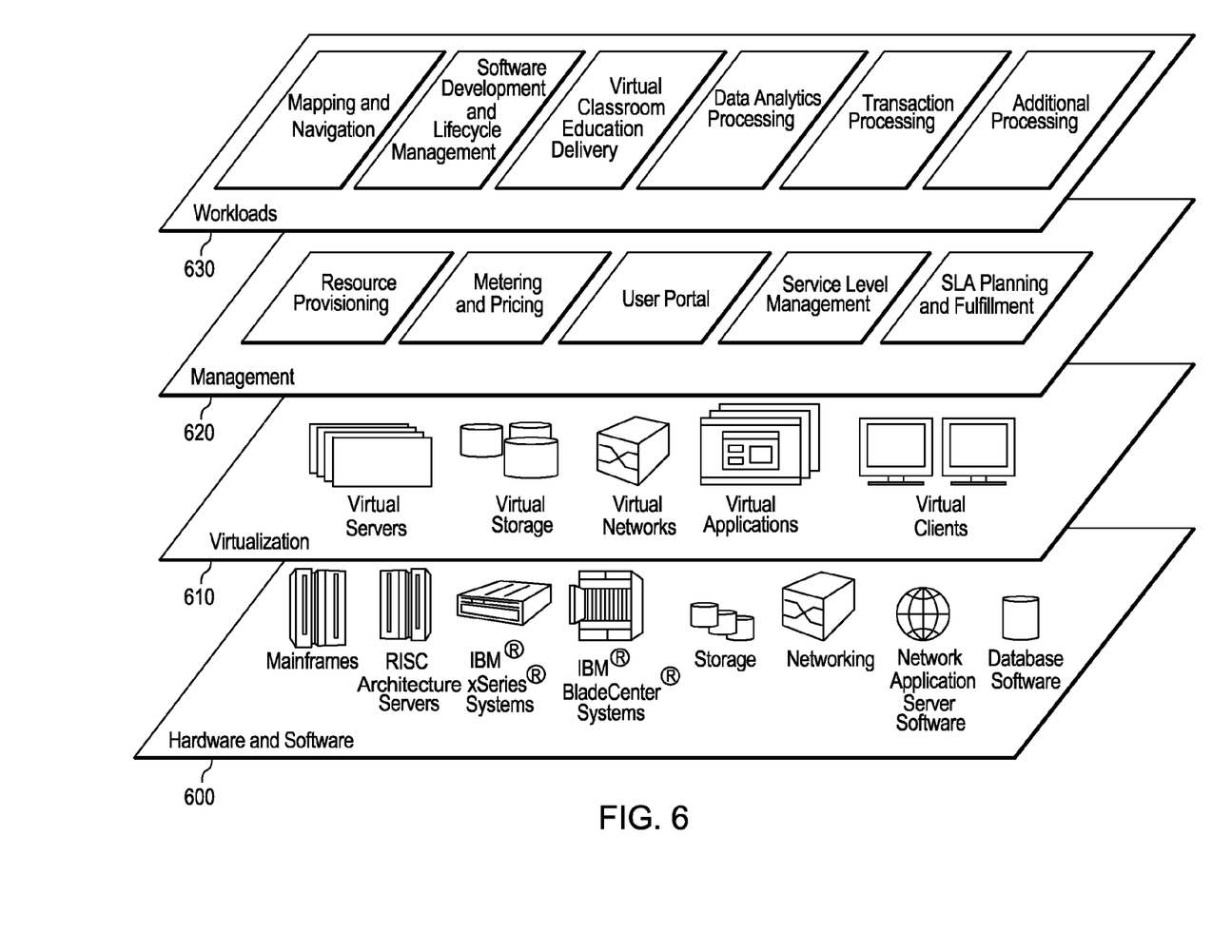
FIG. 6 depicts abstraction model layers in accordance with one embodiment of the present invention.

FIG. 6 depicts a set of functional abstraction layers provided by cloud computing environment 500 (FIG. 5) according to an embodiment of the present invention. It should be understood that the components, layers, and functions shown in FIG. 6 are intended to be illustrative only and embodiments of the invention are not limited thereto. As depicted, the following layers and corresponding functions are provided:

Hardware and software layer 600 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 610 provides an abstraction layer from which the following examples of virtual entities may be provided: virtual servers; virtual storage; virtual networks, including virtual private networks; virtual applications and operating systems; and virtual clients.

In one example, management layer 620 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 630 provides examples of functionality for which the cloud computing environment may be utilized. Examples of workloads and functions which may be provided from this layer include: mapping and navigation; software development and lifecycle management; virtual classroom education delivery; data analytics processing; transaction processing; and additional processing. As mentioned above, all of the foregoing examples described with respect to FIG. 6 are illustrative only, and the invention is not limited to these examples.

It is understood that all functions of the present invention as described herein typically may be performed by the additional processing functionality (of workloads layer 630, which can be tangibly embodied as software and data used to practice embodiments of the present invention, e.g., colony application 80A, B, or C, setup function 90A, B, or C, and device UI configuration function 100A, B or C (FIG. 1). However, this need not be the case. Rather, the functionality recited herein could be carried out/implemented and/or enabled by any of the layers 600, 610, 620 or 630 shown in FIG. 6.

According to various embodiments, additional processes can include utilizing colony application 80A, B, C, etc. to coordinate a collaborative response to an event, e.g., a natural disaster event such as a hurricane, tornado, tsunami, mudslide, monsoon, earthquake, etc. In various embodiments, one or more computing devices (e.g., cloud computing node 60, FIG. 1) can communicate with other computing devices (e.g., computing devices 30, 40, 50) in order to coordinate a collaborative response to the event using a capabilities-aware hive network (e.g., colony cloud service application 110, via network 20).

Figure 7:
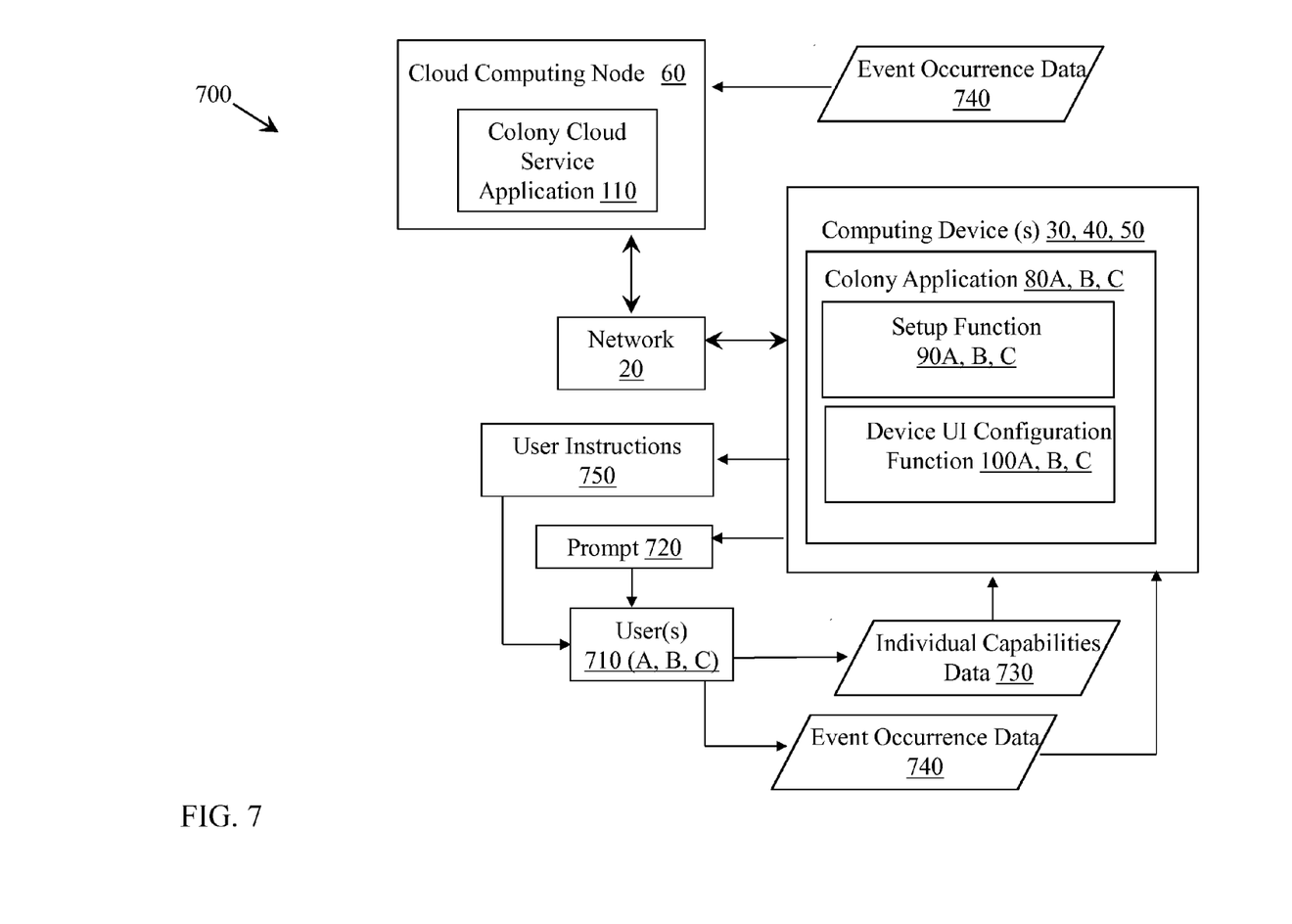
FIG. 7 depicts an environment for coordinating collaborative response to an event according to various embodiments of the disclosure.

FIG. 7 depicts an environment 700 for coordinating collaborative response to an event, e.g., via colony application 80A, 80B, 80C, etc. and colony cloud service application 110. In particular, environment 700 shows user(s) 710, in communication with computing device 30, whereby user(s) 710 is capable of receiving and sending data to colony cloud service application 110 via colony application 80A, B, C, etc. at computing device 30. It is understood, that as describe with respect to FIG. 1, a plurality of computing devices 30 (and corresponding colony applications 80A, 80B, 80C) can be present within environment 700. That is, in order to function as a colony, a plurality of computing devices (e.g., 30, 40, 50) are present in order to allow a plurality of users 710 (e.g., user 710A, 710B, 710C, etc.) to communicate with corresponding colony application 80A, 80B, 80C, etc.

Figure 8:
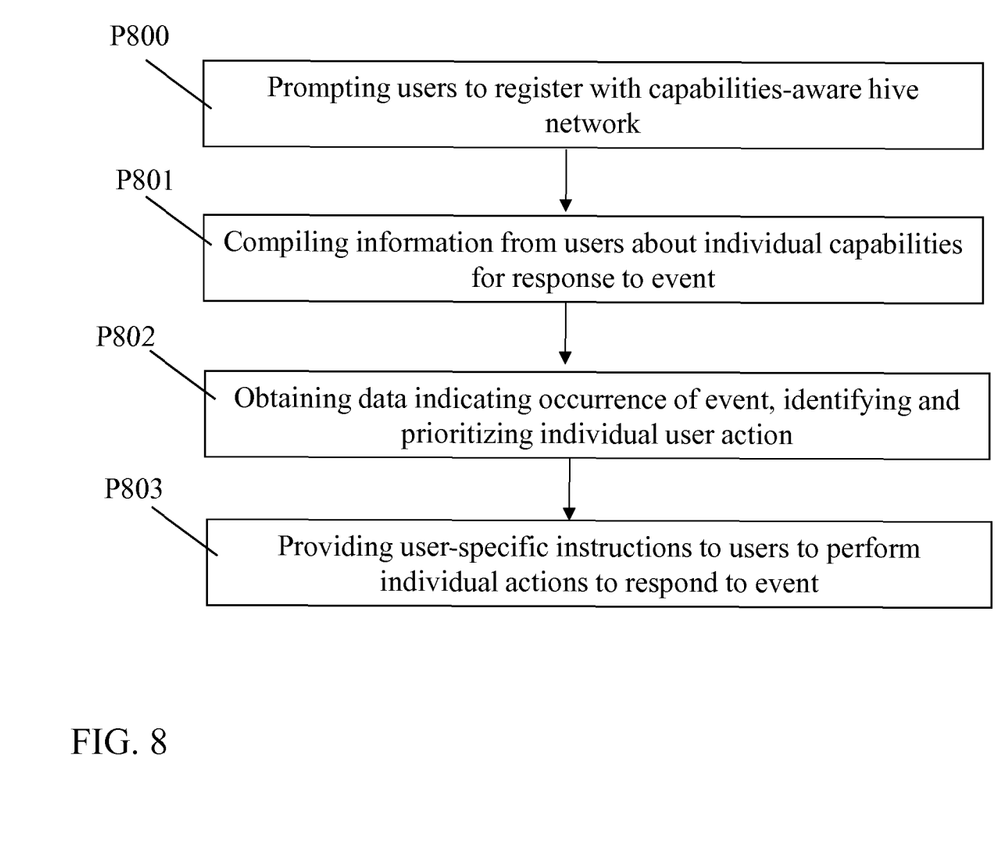
FIG. 8 is a flow diagram illustrating processes according to various embodiments of the disclosure.

FIG. 8 shows a flow chart illustrating processes performed according to various embodiments. The flow chart can be understood in conjunction with environment diagram 700. In various embodiments, the processes can include:

Process P800: prompting a plurality of users (users 710A, 710B, 710C, etc.) to register with the capabilities-aware hive network (colony cloud service application 110). It is understood that registration with the capabilities-aware hive network (colony application 80A, 80B, 80C) can be performed according to various embodiments described herein, e.g., according to embodiments described with respect to FIG. 1. In particular embodiments, the at least one computing device 30, 40, 50 prompts the plurality of users 710 to register with the capabilities-aware hive network (colony cloud service application 110) using a mobile application (colony application 80A, 80B, 80C, etc.) corresponding with the capabilities-aware hive network. In various embodiments, the colony application 80A, B, C, etc. can provide a prompt 720 to user 710 requesting each user 710 provide information about individual capabilities for response to the event (individual capabilities data 730). Occurrence of the event can be indicated by event occurrence data 740, which may be publicly available information about the event, obtained via conventional media channels, national news and/or weather agencies, response organizations, etc., or may be obtained from one or more user(s) 710 registered with the colony application 80A, 80B, 80C. Event occurrence data 740 can indicate a nature of the event (e.g., event type such as hurricane, tornado, monsoon, etc.), location of the event, duration of the event, geographic area affected by the event, areas of restricted access caused by the event, etc.;

Process P801: compiling the information (individual capabilities data 730) from the plurality of users 710 about individual capabilities (of those users 710) for response to the event. In various embodiments, the process of compiling includes categorizing the information (individual capabilities data 730) from the plurality of users 710 about individual capabilities of each user 710, e.g., in categories such as: a) equipment/hardware (e.g., whether a user 710 has access to equipment such as motorized vehicles, land/water/air transportation equipment, earth-moving equipment, etc.); b) training/skills (e.g., whether a user 710 has a particular skill or training, such as in the medical field, tactical operations, crowd control, disaster response, etc.); c) accessibility to travel channels (e.g., whether user 710 has proximity to waterways, roadways, etc.); d) food/water supplies (e.g., whether user 710 has access to, or a store of, food or water supplies), etc.;

Process P802: obtaining data indicating occurrence of the event (event occurrence data 740), and in response to obtaining the data indicating occurrence of the event (event occurrence data 740), identifying and prioritizing individual user actions in response to the event based upon the information (individual capabilities data 730) about the individual capabilities for response to the event; and Process P803: providing user-specific instructions (user instructions 750) to the plurality of users 710A, 710B, 710C, etc. to perform the individual user actions to respond to the event. In various embodiments, the user-specific instructions (user instructions 750) are sent via colony application 80A, 80B, 80C to each individual user 710A, 710B, 710C, respectively, instructing the user 710 to perform his/her individual user actions in response to the occurrence of the event. In various embodiments, the user-specific instructions (user instructions 750) are individually tailored based upon the individual capabilities (individual capabilities data 730) of each user 710 and the characteristics of the event (as indicated by event occurrence data 740). In some embodiments, the colony application 80A, 80B, 80C provides an individual user 710A, 710B, 710C with particular instructions that are not common to other users 710. In some cases, for example, where user 710A is a medical professional, and based upon his/her individual capabilities data 730 it is evident that he/she is capable of providing first aid to the injured in an area proximate user 710A, colony application 80A may send user instructions 750 requesting that user 710A travel to shelter A within a radius of the mobile device belonging to user 710A in order to provide first aid to the wounded at shelter A. Colony application 80A may further determine, based upon event occurrence data 740, that a particular pathway between the user 710A (location indicated, e.g., by conventional GPS technology accessible via mobile device by colony application 80A) and shelter A is obstructed (e.g., by a downed tree, electrical cord, etc.), and may provide individualized instructions for travel to shelter A.

As described herein, various approaches of coordinating a collaborative response to an event can differ from conventional approaches in that each user 710 receives specific instructions for action in response to the event, whereas conventional approaches use broad-based feeds. That is, these conventional approaches do not tailor instructions to individual users, and as such, can be inefficient in coordinating event response.

As described herein, the computing device(s) 30, 40, 50 are configured to communicate with user(s) 710 via a cloud-based communications protocol (e.g., via cloud computing node 60), or via a near-field communication (NFC) based protocol.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., soldering, fastening, ultrasonic welding, bonding). In various embodiments, electronic components described as being "coupled" can be linked via conventional hard-wired and/or wireless means such that these electronic components can communicate data with one another.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A system comprising:
at least one computing device configured to coordinate a collaborative response to an event using a capabilities-aware hive network by performing actions including:
prompting a plurality of users to register with the capabilities-aware hive network using a mobile application corresponding with the capabilities-aware hive network, the prompting including requesting the plurality of users to provide information about individual capabilities for response to the event;
compiling the information from the plurality of users about individual capabilities for response to the event;
obtaining data indicating occurrence of the event, and in response to obtaining the data indicating occurrence of the event, identifying and prioritizing individual user actions in response to the event based upon the information about the individual capabilities for response to the event; and
providing user-specific instructions to the plurality of users to perform the individual user actions to respond to the event, wherein the user-specific instructions are sent to the plurality of users via the capabilities-aware hive network, and wherein the user-specific instructions are not common to other users in the plurality of users, wherein the providing of the user-specific instructions to the plurality of users includes sending instructions to each of the plurality of users to perform the individual user actions via the mobile application, wherein the instructions to each of the plurality of users are individually tailored based upon the individual capabilities of each user and characteristics of the event, wherein the mobile application further determines, based upon characteristics of the event, that a particular pathway between one of the users and a shelter is obstructed, and provides individualized instructions to the one of the users for travel to the shelter.

2. The system of claim 1, wherein the event includes a natural disaster event.

3. The system of claim 1, wherein the compiling includes categorizing the information from the plurality of users about individual capabilities of each user.

4. The system of claim 1, wherein the at least one computing device is configured to communicate with the plurality of users via a near-field communication (NFC) based protocol.

5. A computer program product comprising program code stored on a non-transitory computer readable storage medium, which when executed by at least one computing device, causes the at least one computing device to coordinate a collaborative response to an event using a capabilities-aware hive network by performing actions including:

prompting a plurality of users to register with the capabilities-aware hive network using a mobile application corresponding with the capabilities-aware hive network, the prompting including requesting the plurality of users to provide information about individual capabilities for response to the event;

compiling the information from the plurality of users about individual capabilities for response to the event; obtaining data indicating occurrence of the event, and in response to obtaining the data indicating occurrence of the event, identifying and prioritizing individual user actions in response to the event based upon the information about the individual capabilities for response to the event; and providing user-specific instructions to the plurality of users to perform the individual user actions to respond to the event, wherein the user-specific instructions are sent to the plurality of users via the capabilities-aware hive network, and wherein the user-specific instructions are not common to other users in the plurality of users, wherein the providing of the user-specific instructions to the plurality of users includes sending instructions to each of the plurality of users to perform the individual user actions via the mobile application, wherein the instructions to each of the plurality of users are individually tailored based upon the individual capabilities of each user and characteristics of the event, wherein the mobile application further determines, based upon characteristics of the event, that a particular pathway between one of the users and a shelter is obstructed, and provides individualized instructions to the one of the users for travel to the shelter.

6. The computer program product of claim 5, wherein the event includes a natural disaster event.

7. The computer program product of claim 5, wherein the compiling includes categorizing the information from the plurality of users about individual capabilities of each user.

8. The computer program product of claim 5, wherein the program code, when executed on the at least one computing device, causes the at least one computing device to further communicate with the plurality of users via a near-field communication (NFC) based protocol.

9. A computer-implemented method of coordinating collaborative response to an event using a capabilities-aware hive network, the method performed on at least one computing device, the method comprising:

prompting a plurality of users to register with the capabilities-aware hive network using a mobile application corresponding with the capabilities-aware hive network, the prompting including requesting the plurality of users provide information about individual capabilities for response to the event;

compiling the information from the plurality of users about individual capabilities for response to the event;

obtaining data indicating occurrence of the event, and in response to obtaining the data indicating occurrence of the event, identifying and prioritizing individual user actions in response to the event based upon the information about the individual capabilities for response to the event; and providing user-specific instructions to the plurality of users to perform the individual user actions to respond to the event, wherein the user-specific instructions are sent to the plurality of users via the capabilities-aware hive network, and wherein the user-specific instructions are not common to other users in the plurality of users, wherein the providing of the user-specific instructions to the plurality of users includes sending instructions to each of the plurality of users to perform the individual user actions via the mobile application, wherein the instructions to each of the plurality of users are individually tailored based upon the individual capabilities of each user and characteristics of the event, wherein the mobile application further determines, based upon characteristics of the event, that a particular pathway between one of the users and a shelter is obstructed, and provides individualized instructions to the one of the users for travel to the shelter.

10. The computer-implemented method of claim 9, wherein the event includes a natural disaster event.

11. The computer-implemented method of claim 9, wherein the compiling includes categorizing the information from the plurality of users about individual capabilities of each user.

12. The computer-implemented method of claim 9, further comprising communicating with the plurality of users via a near-field communication (NFC) based protocol.

* * * * *